(12) United States Patent
Ono

(10) Patent No.: US 12,553,782 B2
(45) Date of Patent: Feb. 17, 2026

(54) LOAD CELL AND OUTPUT ADJUSTMENT METHOD OF LOAD CELL

(71) Applicant: SUBARU CORPORATION, Tokyo (JP)

(72) Inventor: Tsubasa Ono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 338 days.

(21) Appl. No.: 18/569,007

(22) PCT Filed: Jun. 29, 2022

(86) PCT No.: PCT/JP2022/026038
§ 371 (c)(1),
(2) Date: Dec. 11, 2023

(87) PCT Pub. No.: WO2024/004095
PCT Pub. Date: Jan. 4, 2024

(65) Prior Publication Data
US 2025/0076131 A1 Mar. 6, 2025

(51) Int. Cl.
*G01L 1/22* (2006.01)
(52) U.S. Cl.
CPC .......... *G01L 1/2281* (2013.01); *G01L 1/2262* (2013.01)
(58) Field of Classification Search
CPC ....... G01L 1/22; G01L 1/2262; G01L 1/2281; G01L 5/1627
See application file for complete search history.

(56) References Cited

U.S. PATENT DOCUMENTS 3,130,578 A * 4/1964 Ames, Jr. .............. G01L 1/2281
73/777
3,161,821 A * 12/1964 John ....................... G01L 1/225
73/725

(Continued)

FOREIGN PATENT DOCUMENTS

CA   1275661 C  * 10/1990 ........... G01L 1/2281
EP   0239094 B1 *  3/1992 ........... G01L 19/148

(Continued)

OTHER PUBLICATIONS

International Search Report received in PCT/JP2022/026038, dated Aug. 2, 2022.

*Primary Examiner* — John Fitzgerald
(74) *Attorney, Agent, or Firm* — Rimon P.C.

(57) ABSTRACT

A load cell includes a bridge circuit that converts and outputs a change in resistance of a strain gauge, which changes in accordance with a load. The load cell includes, in a first path on one side of the bridge circuit, a first chip resistor that adjusts an initial balance of the bridge circuit, and a thermistor that compensates for a temperature characteristic of the bridge circuit and a first adjustment resistor that adjusts a deviation of the initial balance with the thermistor being provided, which are connected in series with the first chip resistor and connected in parallel. The load cell includes, in a second path on another side of the bridge circuit, a second chip resistor that adjusts the initial balance, and a second adjustment resistor that adjusts the deviation caused by providing the first adjustment resistor and is connected in series with the second chip resistor.

7 Claims, 5 Drawing Sheets

(56) References Cited

U.S. PATENT DOCUMENTS

| | | | | | |
|---|---|---|---|---|---|
| 3,290,928 | A | * | 12/1966 | Curry | G01L 1/225 338/3 |
| 3,358,501 | A | * | 12/1967 | Ormond | G01L 1/2218 73/862.622 |
| 3,759,093 | A | * | 9/1973 | Farr | G01L 1/2275 73/862.622 |
| 4,173,148 | A | * | 11/1979 | Yamada | G01B 7/18 73/766 |
| 4,541,496 | A | * | 9/1985 | Layer | G01G 3/1414 73/862.623 |
| 4,628,296 | A | * | 12/1986 | Kitagawa | G01L 1/2262 73/764 |
| 4,657,097 | A | * | 4/1987 | Griffen | G01L 1/2243 73/862.633 |
| RE32,631 | E | * | 3/1988 | Layer | G01L 1/2281 73/862.623 |
| 4,747,456 | A | * | 5/1988 | Kitagawa | G01L 1/2281 338/3 |
| 4,958,526 | A | * | 9/1990 | Haggstrom | G01L 1/2268 73/862.622 |
| 4,979,580 | A | * | 12/1990 | Lockery | G01L 1/2262 73/862.633 |
| 5,929,390 | A | * | 7/1999 | Naito | G01G 3/1412 177/229 |
| 6,147,312 | A | * | 11/2000 | Lockery | G01L 1/2268 73/1.15 |
| 11,137,309 | B2 | * | 10/2021 | Huo | G01L 9/06 |
| 2009/0255736 | A1 | * | 10/2009 | Naito | B07C 5/18 177/52 |
| 2017/0205220 | A1 | * | 7/2017 | Fahimi | G01L 9/045 |
| 2025/0076131 | A1 | * | 3/2025 | Ono | G01L 5/1627 |

FOREIGN PATENT DOCUMENTS

| | | | | | |
|---|---|---|---|---|---|
| EP | 2450686 | B1 | * | 12/2013 | G01L 1/2256 |
| JP | H06174536 | A | * | 6/1994 | G01G 23/3707 |
| JP | H0921715 | A | * | 1/1997 | |
| JP | 2001527652 | A | * | 12/2001 | G01L 1/2281 |
| JP | 3251081 | B2 | * | 1/2002 | G01G 23/3707 |
| JP | 2005003487 | A | * | 1/2005 | |
| JP | 2008-151596 | A | | 7/2008 | |
| JP | 5126852 | B2 | * | 1/2013 | |

\* cited by examiner

LOAD CELL AND OUTPUT ADJUSTMENT METHOD OF LOAD CELL

CROSS-REFERENCE TO RELATED APPLICATIONS

This application is the U.S. National Phase under 35 U.S.C. § 371 of International Application No. PCT/JP2022/026038, filed on Jun. 29, 2022.

TECHNICAL FIELD

The present disclosure relates to a load cell including a bridge circuit and an output adjustment method of the load cell.

BACKGROUND ART

In a widely used load cell, a change in the resistance value of a strain gauge occurs by a strain generated by a load. For example, a known load cell is configured as follows. A strain gauge is incorporated in a bridge circuit, which is a conversion circuit that converts a change in the resistance value of the strain gauge due to a load into an electric signal, and the change in the resistance value is output as the electric signal.

In the load cell having such a configuration, both the strain gauge and a strain generating body to which the strain gauge is attached have temperature characteristics in which a strain is generated by a temperature change. In addition, even if there is actually no load, an output may be generated as if a load is received. If the strain gauge is used in the bridge circuit, the bridge circuit is configured to cancel linear expansion of the strain gauge. Thus, a difference between the temperature characteristics of the strain gauges or the strain generating body is output as the temperature characteristics of the load cell. Therefore, appropriate temperature compensation is expected in order to detect the amount of strain due to the load applied to the strain gauge.

For example, PTL 1 discloses a load cell including a zero balance (initial balance) adjustment circuit in which a chip resistor is provided so that a potential difference extracted from a bridge circuit becomes zero when a load is zero at a predetermined temperature.

CITATION LIST

Patent Literature

PTL 1: Japanese Unexamined Patent Application Publication No. 2008-151596

SUMMARY OF INVENTION

Technical Problem

However, in some load cells, a range of change in the resistance value of the strain gauge depending on temperature is wide, and thus, it is not easy to adjust the initial balance while compensating for the temperature characteristics. Such load cells include a load cell that has a large output, such as a force detection sensor provided on an axle of an automobile to detect a load applied to a wheel, and a load cell that detects component forces and has a large difference in sensitivity to each component force.

The present disclosure has been made in view of the above problems. An object of the present disclosure is to provide a load cell and an output adjustment method of the load cell capable of adjusting the initial balance of the resistance value while compensating for the temperature characteristics of the load cell using a strain gauge having a relatively large element resistance value and temperature dependency.

Solution to Problem

In order to solve the above problems, according to an aspect of the present disclosure,
a load cell including a bridge circuit configured to convert a change in resistance of a strain gauge, which changes in accordance with a load, into an electric signal and output the electric signal is provided. The load cell includes:
in a first path on one side of the bridge circuit,
a first chip resistor configured to adjust an initial balance of the bridge circuit; and
a thermistor configured to compensate for a temperature characteristic of the bridge circuit and a first adjustment resistor configured to adjust a deviation of the initial balance in a state in which the thermistor is provided, the thermistor and the first adjustment resistor being connected in series with the first chip resistor and connected in parallel with each other, and
in a second path on another side of the bridge circuit,
a second chip resistor configured to adjust the initial balance of the bridge circuit; and
a second adjustment resistor configured to adjust the deviation of the initial balance caused by providing the first adjustment resistor in the first path, the second adjustment resistor being connected in series with the second chip resistor.

Furthermore, in order to solve the above problems, according to an aspect of the present disclosure,
an output adjustment method of a load cell including a bridge circuit configured to convert a change in resistance of a strain gauge, which changes in accordance with a load, into an electric signal and output the electric signal is provided. The output adjustment method includes:
connecting a first chip resistor configured to adjust an initial balance of the bridge circuit, in a first path on one side of the bridge circuit;
connecting a second chip resistor configured to adjust the initial balance of the bridge circuit, in a second path on another side of the bridge circuit;
connecting a thermistor configured to compensate for a temperature characteristic of the bridge circuit and a first adjustment resistor configured to adjust a deviation of the initial balance in a state in which the thermistor is provided, the thermistor and the first adjustment resistor being connected in series with the first chip resistor, in parallel with each other in the first path; and
connecting a second adjustment resistor configured to adjust the deviation of the initial balance caused by providing the first adjustment resistor in the first path, the second adjustment resistor being connected in series with the second chip resistor, in the second path.

Advantageous Effects of Invention

As described above, according to the present disclosure, it is possible to easily adjust the initial balance of the resistance value while compensating for the temperature characteristics of the load cell using the strain gauge having the relatively large element resistance value and temperature dependency.

DESCRIPTION OF EMBODIMENTS

Figure 1:
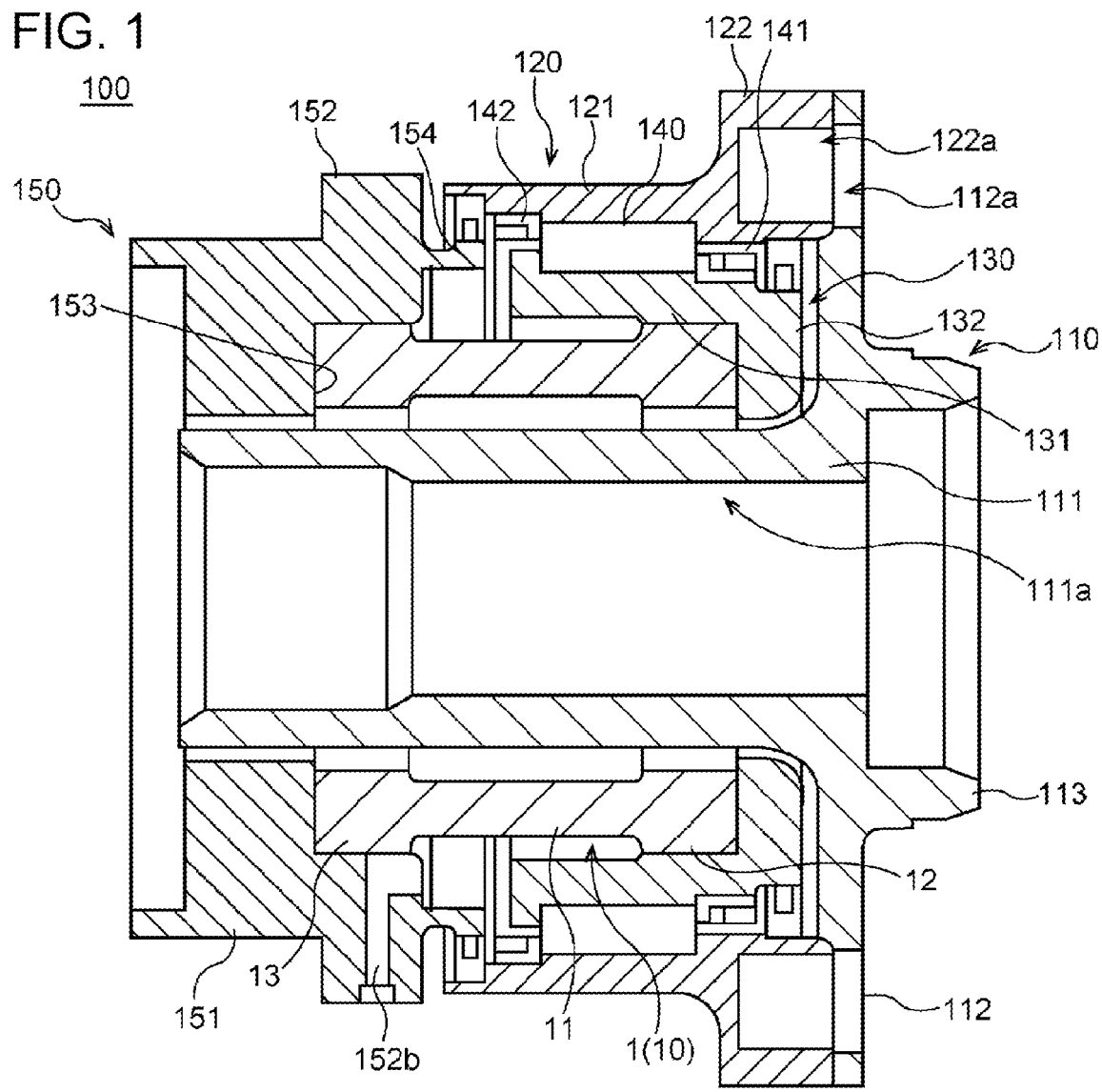
FIG. 1 is a cross-sectional view illustrating a load cell (six-component force detector) according to an embodiment.

Hereinafter, a preferred embodiment of the disclosure will be described in detail with reference to the accompanying drawings. In the specification and the drawings, components having substantially the same function and configuration are denoted by the same reference numerals, and redundant description thereof will be omitted.

1. Summary of Embodiment of Present Disclosure

1-1. Detailed Description of Background of Present Disclosure

First, a background to the creation of the technology of the present disclosure will be described. Note that the background described below merely illustrates one aspect of the configuration of a load cell to which the technology of the present disclosure can be applied. The load cell to which the present disclosure can be applied is not limited to the load cell having the configuration exemplified below.

As loads applied to a wheel of a vehicle such as an automobile, a known six-component force detector detects loads (Fx, Fy, and Fz) applied in a front-back direction (hereinafter also referred to as "x-axis direction") of the vehicle, a vehicle width direction (hereafter also referred to as "y-axis direction"), and a height direction (hereafter also referred to as "z-axis direction"). The six-component force detector also detects moments (Mx, My, and Mz) around the x-axis, the y-axis, and the z-axis, respectively. Such a six-component force detector has a cylindrical strain generating body attached to an axle. However, when tolerance to an applied load is taken into consideration, by using a general foil strain gauge having a gauge factor of about 2, it is difficult to obtain an output equivalent to that of a load cell that detects only a load in one axial direction.

In contrast, it is considered that a desired output can be obtained by using a thin-film strain gauge, such as a Cr—N gauge, having a large element resistance value and a large gauge factor (for example, the gauge factor of the Cr—N gauge is 10 to 12). However, the Cr—N gauge has a large temperature dependency of the element resistance value, which is a problem to be applied to a six-component force detector. That is, when a strain gauge having a large element resistance value and a large gauge factor is used, a change in resistance value due to a temperature change in a use temperature range becomes large. Thus, there is a problem in that it is not easy to compensate for temperature characteristics of an output of the six-component force detector.

In addition, the six-component force detector has a characteristic that the sensitivity of the strain gauge largely differs depending on the direction of the component force. For this reason, even if the bridge circuit is configured by using the general foil strain gauge and the initial balance is adjusted in accordance with the component force having low sensitivity, there is a possibility that the temperature characteristics compensation is not sufficient for the component force having high sensitivity.

Accordingly, the following is also conceivable. Characteristics of a change in the output depending on temperature are obtained, and temperature characteristics map data is prepared in advance. For example, the temperature of the strain gauge is directly measured, and, based on the temperature characteristics map data, a processor performs processing of correcting the output from the six-component force detector. However, since it is necessary to add a temperature sensor and an arithmetic processing function of software, which are originally unnecessary, it is not a desirable solution.

In view of such a background, the technology of the present disclosure provides a load cell and an output adjustment method of the load cell capable of adjusting an initial balance while compensating for temperature characteristics in a use temperature range. The load cell and the output adjustment method of the load cell are provided without adding a temperature sensor or a function of software even if a strain gauge having a large element resistance value and a large gauge factor is used.

1-2. Features of Embodiment of Present Disclosure (1-2-1)

An embodiment of the present disclosure is a load cell including a bridge circuit that converts a change in resistance of a strain gauge, which changes in accordance with a load, into an electric signal and outputs the electric signal. The load cell has a configuration including:
in a first path on one side of the bridge circuit,
a first chip resistor for adjusting an initial balance of the bridge circuit; and a thermistor for compensating for a temperature characteristic of the bridge circuit and a first adjustment resistor for adjusting a deviation of the initial balance in a state in which the thermistor is provided, the thermistor and the first adjustment resistor being connected in series with the first chip resistor and connected in parallel with each other, and in a second path on another side of the bridge circuit, a second chip resistor for adjusting the initial balance of the bridge circuit; and a second adjustment resistor for adjusting the deviation of the initial balance caused by providing the first adjustment resistor in the first path, the second adjustment resistor being connected in series with the second chip resistor.

Note that the embodiment of the present disclosure can also be implemented as an output adjustment method of adjusting an output of a load cell including a bridge circuit that converts a change in resistance of a strain gauge, which changes in accordance with a load, into an electric signal and outputs the electric signal.

With this configuration, it is possible to easily adjust the initial balance while compensating for the temperature characteristics of the following load cells. The load cells are, for example, a load cell using a strain gauge having a relatively large element resistance value of 1 kΩ or more and large temperature characteristics, and a load cell configured to be capable of detecting component forces. Therefore, the reliability of the output of the load cell can be increased.

Note that the expression "first path on one side of the bridge circuit" and the expression "second path on another side of the bridge circuit" indicate two current paths in the bridge circuit. The first path and the second path are each configured to include two strain gauges.

In addition, the term "initial balance" indicates a difference (potential difference) between a potential between the two strain gauges provided in the first path and a potential between the two strain gauges provided in the second path in a state in which no load is applied to the load cell. The expression "adjusting the deviation of the initial balance" indicates adjusting the potential difference so as to approach zero in a state in which no load is applied.

In addition, the expression "temperature characteristics of the bridge circuit" indicates characteristics in which the output of the load cell changes with temperature. The expression "large temperature characteristics" indicates that the fluctuation range of the output of the load cell, which changes with temperature, is large. The expression "compensating for the temperature characteristics of the bridge circuit" indicates that the fluctuation range of the output of the load cell, which changes with temperature, is adjusted so as to fall within a predetermined range.

(1-2-2)

In addition, in the embodiment of the present disclosure, the first adjustment resistor and the second adjustment resistor may be identical resistor elements.

With this configuration, it is possible to save the trouble of individually selecting the first adjustment resistor and the second adjustment resistor capable of compensating for the temperature characteristics in a state in which the first chip resistor and the second chip resistor are connected to the bridge circuit. In addition, even if the first adjustment resistor and the second adjustment resistor are the identical resistor elements, the deviation of the initial balance of the bridge circuit can fall within the predetermined range.

(1-2-3)

In addition, in the embodiment of the present disclosure, in at least one of the first path and the second path, a third adjustment resistor for adjusting the deviation of the initial balance caused by providing the second adjustment resistor may be provided.

With this configuration, the deviation of the initial balance can be easily adjusted. The deviation of the initial balance can be easily adjusted even if a slight deviation of the initial balance is generated when the first adjustment resistor and the second adjustment resistor, which are the identical resistor elements, are disposed in the first path and the second path, respectively.

(1-2-4)

In addition, in the embodiment of the present disclosure, the strain gauge may have an element resistance value of greater than or equal to 1 KΩ.

With this configuration, it is possible to detect a relatively large desired load by the load cell in which the temperature characteristics are compensated for while the strain gauge having a relatively large element resistance value is used.

(1-2-5)

In addition, in the embodiment of the present disclosure, the load cell may include the bridge circuits, and the load cell may be a multi-component force detector configured to detect component forces.

With this configuration, even if the bridge circuits having different sensitivities to strain depending on directions of component forces are provided, it is possible to easily adjust the initial balance while compensating for temperature characteristics of outputs from the respective bridge circuits.

2. Details of Embodiment of Present Disclosure 2-1. Configuration Example of Load Cell (Six-Component Force Detector)

Next, a configuration example of a load cell according to the embodiment of the present disclosure will be described.

An example will be described in the embodiment. In the example, the technology of the present disclosure is applied to the six-component force detector capable of detecting six component forces (Fx, Fy, Fz, Mx, My, and Mz) applied to a wheel of a vehicle as an aspect of a load cell. The load cell according to the embodiment is the six-component force detector that detects six component forces applied to the wheel. The load cell is incorporated in a hub bearing unit that is attached to a suspension device and rotatably supports the wheel of a vehicle such as an automobile.

FIG. 1 is a cross-sectional view of the hub bearing unit including the six-component force detector taken along a plane including an axle. In FIG. 1, the right side indicates the outer side in the vehicle width direction, and the left side indicates the inner side in the vehicle width direction. Note that the configuration of the hub bearing unit illustrated in FIG. 1 is merely an example, and is not limited to the configuration illustrated in FIG. 1.

A hub bearing unit 100 includes a hub 110, an outer cylinder 120, an inner cylinder 130, a rolling element 140, a base 150, and a six-component force detector 1. The hub 110 is a member to which a rim disc of a wheel (not illustrated) including a rim and a tire is fastened. The hub 110 is configured by permanently affixing a cylinder 111, a flange 112, a collar 113, and the like.

The cylinder 111 is formed in a cylindrical shape concentric with the rotation central axis (axle) of the wheel. The cylinder 111 is inserted into the inner diameter side of the inner cylinder 130, a sensing unit 10, and the base 150. A spline hole 111a into which a spline shaft of a drive shaft (not illustrated) is to be fitted is formed in a region on the outer side in the vehicle width direction of an inner peripheral surface of the cylinder 111. The flange 112 has a disc shape and is formed so as to protrude in a handguard shape from an end on the outer side in the vehicle width direction of the cylinder 111 toward the outer diameter side. A surface on the outer side in the vehicle width direction of the flange 112 functions as a base to which the rim disc is to be fastened. In the flange 112, for example, about five openings 112a into which hub bolts are to be inserted are formed at equal intervals in the circumferential direction on a predetermined pitch circle diameter. The collar 113 has a cylindrical shape that protrudes from the surface on the outer side in the vehicle width direction of the flange 112 and is concentric with the axle. The collar 113 is fitted into a center bore, which is a circular opening formed in the center of the rim disc, and improves the mounting accuracy of the wheel.

The outer cylinder 120, the inner cylinder 130, and the rolling element 140 form a rolling bearing (hub bearing) that rotatably supports the wheel in collaboration with one another. The outer cylinder 120 is configured by permanently affixing a cylinder 121, a flange 122, and the like. The cylinder 121 has a cylindrical shape concentric with the axle. A raceway surface for guiding the rolling element 140 is formed on the inner peripheral surface of the cylinder 121. An end on the inner side in the vehicle width direction of the cylinder 121 is formed so as to protrude toward the inner side in the vehicle width direction with respect to an end on the inner side in the vehicle width direction of a cylinder 131 of the inner cylinder 130.

The flange 122 is formed so as to protrude in a handguard shape from an end on the outer side in the vehicle width direction of the cylinder 121 toward the outer diameter side. The flange 112 of the hub 110 is fastened and fixed to the flange 122. A surface on the outer side in the vehicle width direction of the flange 122 abuts against a surface on the inner side in the vehicle width direction of the flange 112 of the hub 110. The flange 122 has screw holes 122a formed concentrically with the openings 112a of the hub 110. A hub bolt (not illustrated) used for fixing the wheel is to be fastened to the screw holes 122a.

The inner cylinder 130 is configured by permanently affixing the cylinder 131, a flange 132, and the like. The cylinder 131 is a cylindrical member concentric with the axle, and is inserted into the inner diameter side of the cylinder 121 of the outer cylinder 120. A predetermined interval is provided between the outer peripheral surface of the cylinder 131 and the inner peripheral surface of the cylinder 121 of the outer cylinder 120. A raceway surface for guiding the rolling element 140 is formed on the outer peripheral surface of the cylinder 131. The flange 132 is formed so as to protrude from an end on the outer side in the vehicle width direction of the cylinder 131 toward the inner diameter side. The flange 132 holds an end on the outer side in the vehicle width direction of a first flange 12 of the sensing unit 10. The rolling element 140 is a bearing incorporated between the raceway surfaces of the outer cylinder 120 and the inner cylinder 130. The rolling element 140 is incorporated between the outer cylinder 120 and the inner cylinder 130 together with a cage 141 and a cage 142 for positioning the rolling element 140 between the outer cylinder 120 and the inner cylinder 130.

The base 150 fastens and fixes the hub bearing unit 100 to an upright (hub knuckle) (not illustrated) of the suspension device. The base 150 is configured by permanently affixing a cylinder 151, a flange 152, a recess 153, a protrusion 154, and the like. The cylinder 151 is a cylindrical member concentric with the axle, and an end on the inner side in the vehicle width direction of the cylinder 111 of the hub 110 is inserted therein. The outer peripheral surface of the cylinder 111 of the hub 110 is disposed so as to face the inner peripheral surface of the cylinder 151 with a predetermined interval interposed therebetween in the radial direction.

The flange 152 is formed so as to protrude in a handguard shape from an end on the outer side in the vehicle width direction of the cylinder 151 toward the outer diameter side. The flange 152 is a fastening surface that fastens the base 150 to the upright (not illustrated). In the flange 152, openings 152a are formed in a distributed manner in the circumferential direction, and bolts used for fastening to the upright are to be inserted into the openings 152a. Inside the flange 152, a through-hole 152b is formed, from the inside of a space in which the outer peripheral surface of a cylinder 11 of the sensing unit 10 is disposed, to the outer peripheral edge of the flange 152. In the through-hole 152b, for example, a wiring connected to a strain gauge is disposed.

The recess 153 is formed by stepwise expanding the inner diameter of a region corresponding to the flange 152 in the axial direction in the inner peripheral surface of the base 150. The recess 153 holds a second flange 13 of the sensing unit 10. The protrusion 154 has a cylindrical shape formed so as to protrude from an intermediate portion of the flange 152 in the radial direction toward the outer side of the vehicle width direction. The outer peripheral surface of the protrusion 154 is disposed so as to face the inner peripheral surface at an end on the inner side in the vehicle width direction of the cylinder 121 of the outer cylinder 120, with an interval interposed therebetween in the radial direction.

The six-component force detector 1 is a load cell capable of detecting loads in three orthogonal axis directions and moments around the three orthogonal axes acting on the wheel. The six-component force detector 1 includes the substantially cylindrical sensing unit 10, strain gauges provided on the sensing unit 10, and a bridge circuit including the strain gauges.

The sensing unit (sensor core) 10 includes the cylinder 11, the first flange 12, the second flange 13, and the like. The cylinder 11 is formed in a cylindrical shape in which the inner diameter and the outer diameter are substantially constant over a predetermined length in the axial direction, and strain gauges described later are attached (adhered) to the cylinder 11. The first flange 12 is provided at an end on the outer side in the vehicle width direction of the cylinder 11 and is formed so as to protrude toward the outer diameter side and the inner diameter side with respect to the cylinder 11. The first flange 12 is fixed to the inner cylinder 30 in a state in which the outer peripheral surface abuts against the inner peripheral surface in the vicinity of an end on the outer side in the vehicle width direction of the cylinder 131 of the inner cylinder 30, and an end surface abuts against a surface on the inner side in the vehicle width direction of the flange 132.

The second flange 13 is provided at an end on the inner side in the vehicle width direction of the cylinder 11, and is formed so as to protrude toward the outer diameter side and the inner diameter side with respect to the cylinder 11. The second flange 13 is fixed to the base 150 in a state in which the outer peripheral surface and an end surface thereof are fitted into the recess 153 of the base 150. With such a configuration, substantially all of the forces acting on the wheel are transmitted to and from the base 150 via the sensing unit 10.

The six-component force detector 1 includes an Fx detection system, an Fy detection system, an Fz detection system, an Mx detection system, an My detection system, and an Mz detection system each having a bridge circuit including the strain gauges provided on the cylinder 11 of the sensing unit 10 described above. The Fx detection system detects a force Fx acting on the cylinder 11 of the sensing unit 10 in the radial direction (x-axis direction). The Fy detection system detects a force Fy acting on the cylinder 11 of the sensing unit 10 in the axial direction (y-axis direction). The Fz detection system detects a force Fz acting on the cylinder 11 of the sensing unit 10 in the radial direction (z-axis direction) orthogonal to the x-axis direction. The Mx detection system detects a moment Mx around the x-axis acting on the cylinder 11 of the sensing unit 10. The My detection system detects a moment My around the y-axis acting on the cylinder 11 of the sensing unit 10. The Mz detection system detects a moment Mz around the z-axis acting on the cylinder 11 of the sensing unit 10.

Figure 2:
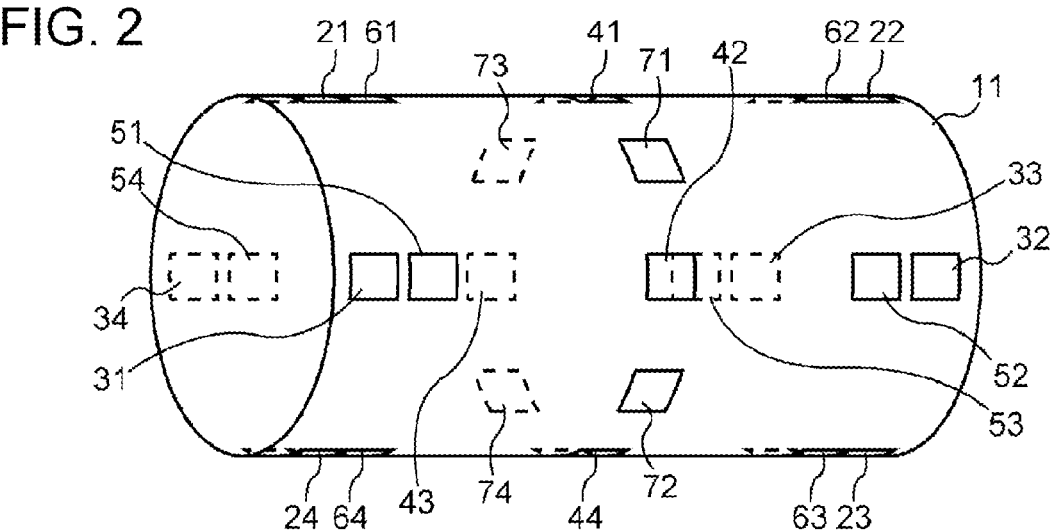
FIG. 2 is a schematic diagram illustrating an arrangement of strain gauges in the load cell according to the embodiment.
Figure 3:
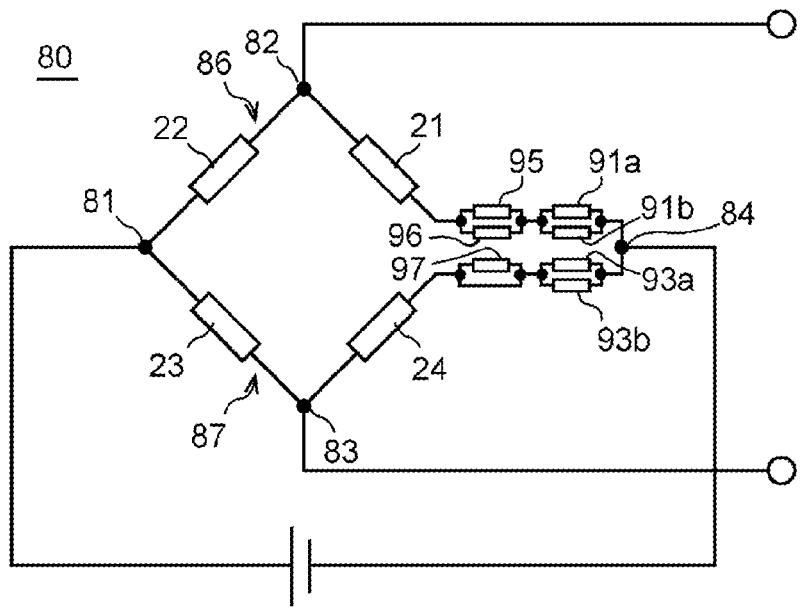
FIG. 3 is an explanatory diagram illustrating a configuration of a bridge circuit in the load cell according to the embodiment.

Each of the above-described Fx detection system, Fy detection system, Fz detection system, Mx detection system, My detection system, and Mz detection system has the bridge circuit including four strain gauges. FIG. 2 is a schematic diagram illustrating an arrangement of the strain gauges in the six-component force detector 1. FIG. 3 is a diagram illustrating the arrangement of the strain gauges of the Fx detection system and the configuration of the bridge circuit in the six-component force detector 1. FIG. 3 illustrates a representative example of the arrangement of the strain gauges of each force detection system (the Fx detection system, the Fy detection system, and the Fz detection system) and each moment detection system (the Mx detection system, the My detection system, and the Mz detection system) and the configuration of the bridge circuit.

As illustrated in FIGS. 2 and 3, the Fx detection system includes strain gauges 21 to 24. The strain gauges 21 to 24 are single-axis strain gauges. The strain gauges 21 to 24 are attached to the outer peripheral surface of the cylinder 11 such that the detection directions thereof are parallel with the central axis direction of the cylinder 11. The strain gauge 21 is disposed in a region on the first flange 12 side (region close to an intermediate portion 14) on the outer peripheral surface of the cylinder 11. The strain gauge 22 is disposed on a straight line that passes through the strain gauge 21 and is parallel with the axial direction of the cylinder 11, and is disposed in a region on the second flange 13 side (region close to an intermediate portion 15) on the outer peripheral surface of the cylinder 11. The strain gauge 23 is disposed at a position shifted by 180 degrees around the central axis of the cylinder 11 as viewed from the strain gauge 22 (position symmetrical to the strain gauge 22 with respect to the central axis of the cylinder 11). The strain gauge 24 is disposed at a position shifted by 180 degrees around the central axis of the cylinder 11 as viewed from the strain gauge 21 (position symmetrical to the strain gauge 21 with respect to the central axis of the cylinder 11).

As illustrated in FIG. 3, the bridge circuit of the Fx detection system is formed as a Wheatstone bridge circuit. In the circuit, the strain gauges 21 to 24 are sequentially connected in a loop shape. A positive electrode and a negative electrode of a power source are connected between the strain gauge 22 and the strain gauge 23 and between the strain gauge 21 and the strain gauge 24, respectively. The bridge circuit extracts a potential difference between a terminal between the strain gauge 21 and the strain gauge 22 and a terminal between the strain gauge 23 and the strain gauge 24 as an output. The configuration of the bridge circuit will be described later in detail.

The Fy detection system includes strain gauges 41 to 44. The strain gauges 41 to 44 are single-axis strain gauges. The strain gauges 41 to 44 are attached to the outer peripheral surface of the cylinder 11 such that the detection directions thereof are parallel with the central axis direction of the cylinder 11. The strain gauge 41 is disposed in the middle between the strain gauges 21 and 22 of the Fx detection system. The strain gauges 42, 43, and 44 are disposed at positions where phases around the central axis of the cylinder 11 is shifted by 90 degrees, 180 degrees, and 270 degrees with respect to the strain gauge 41, respectively. The bridge circuit of the Fy detection system has the same configuration except that the strain gauges 21 to 24 of the Fx detection system illustrated in FIG. 3 are replaced with the strain gauges 41 to 44.

The Fz detection system includes strain gauges 31 to 34. The strain gauges 31 to 34 are single-axis strain gauges. The strain gauges 31 to 34 are attached to the outer peripheral surface of the cylinder 11 such that the detection directions thereof are parallel with the central axis direction of the cylinder 11. The strain gauge 31 is disposed so as to be shifted by 90 degrees around the central axis of the cylinder 11 with respect to the strain gauge 21 of the Fx detection system. The strain gauge 32 is disposed so as to be shifted by 90 degrees around the central axis of the cylinder 11 with respect to the strain gauge 22 of the Fx detection system. The strain gauges 31 and 32 are disposed on the same straight line parallel with the axial direction of the cylinder 11. The strain gauge 33 is disposed at a position shifted by 180 degrees around the central axis of the cylinder 11 as viewed from the strain gauge 32 (position symmetrical to the strain gauge 32 with respect to the central axis of the cylinder 11). The strain gauge 34 is disposed at a position shifted by 180 degrees around the central axis of the cylinder 11 as viewed from the strain gauge 31 (position symmetrical to the strain gauge 31 with respect to the central axis of the cylinder 11). The bridge circuit of the Fz detection system has the same configuration except that the strain gauges 21 to 24 of the Fx detection system illustrated in FIG. 3 are replaced with the strain gauges 31 to 34.

The Mx detection system includes strain gauges 51 to 54. The strain gauges 51 to 54 are single-axis strain gauges. The strain gauges 51 to 54 are attached to the outer peripheral surface of the cylinder 11 such that the detection directions thereof are parallel with the central axis direction of the cylinder 11. The strain gauge 51 is disposed so as to be adjacent to the strain gauge 31 of the Fz detection system in the central axis of the cylinder 11. The strain gauge 52 is disposed so as to be adjacent to the strain gauge 32 of the Fz detection system in the central axis of the cylinder 11. The strain gauges 51 and 52 are disposed on the same straight line parallel with the axial direction of the cylinder 11. The strain gauge 53 is disposed at a position shifted by 180 degrees around the central axis of the cylinder 11 as viewed from the strain gauge 52 (position symmetrical to the strain gauge 52 with respect to the central axis of the cylinder 11). The strain gauge 54 is disposed at a position shifted by 180 degrees around the central axis of the cylinder 11 as viewed from the strain gauge 51 (position symmetrical to the strain gauge 51 with respect to the central axis of the cylinder 11). The bridge circuit of the Mx detection system has the same configuration except that the strain gauges 21 to 24 of the Fx detection system illustrated in FIG. 3 are replaced with the strain gauges 51 to 54.

The My detection system includes strain gauges 71 to 74. The strain gauges 71 to 74 are shear strain gauges. The strain gauges 71 to 74 are attached to the outer peripheral surface of the cylinder 11 such that the detection directions thereof are the circumferential direction of the cylinder 11. The strain gauge 71 is disposed in the middle between the strain gauges 41 and 42 of the Fy detection system. The strain gauge 72 is disposed in the middle between the strain gauges 42 and 44 of the Fy detection system. The strain gauges 73 and 74 are disposed at positions symmetrical to the strain gauges 72 and 71, respectively, with respect to the central axis of the cylinder 11. The bridge circuit of the My detection system has the same configuration except that the strain gauges 21 to 24 of the Fx detection system illustrated in FIG. 3 are replaced with the strain gauges 61 to 64.

The Mz detection system includes strain gauges 61 to 64. The strain gauges 61 to 64 are single-axis strain gauges. The strain gauges 61 to 64 are attached to the outer peripheral surface of the cylinder 11 such that the detection directions thereof are parallel with the central axis direction of the cylinder 11. The strain gauge 61 is disposed so as to be adjacent to the strain gauge 21 of the Fx detection system in the central axis of the cylinder 11. The strain gauge 62 is disposed so as to be adjacent to the strain gauge 22 of the Fx detection system in the central axis of the cylinder 11. The strain gauges 61 and 62 are disposed on the same straight line parallel with the axial direction of the cylinder 11. The strain gauge 63 is disposed at a position shifted by 180 degrees around the central axis of the cylinder 11 as viewed from the strain gauge 62 (position symmetrical to the strain gauge 62 with respect to the central axis of the cylinder 11). The strain gauge 64 is disposed at a position shifted by 180 degrees around the central axis of the cylinder 11 as viewed from the strain gauge 61 (position symmetrical to the strain gauge 61 with respect to the central axis of the cylinder 11). The bridge circuit of the Mz detection system has the same configuration except that the strain gauges 21 to 24 of the Fx detection system illustrated in FIG. 3 are replaced with the strain gauges 61 to 64.

2-2. Bridge Circuit

Next, taking the bridge circuit of the Fx detection system illustrated in FIG. 3 as an example, a configuration example of the bridge circuit of each force detection system and each moment detection system will be described, for example.

A bridge circuit 80 of the Fx detection system illustrated in FIG. 3 includes four terminals, which are first, second, third, and fourth terminals 81, 82, 83, and 84, and the four strain gauges 21, 22, 23, and 24. The strain gauge 21 is provided between the first terminal 81 and the second terminal 82, and the strain gauge 22 is provided between the second terminal 82 and the fourth terminal 84. The strain gauge 24 is provided between the first terminal 81 and the third terminal 83, and the strain gauge 23 is provided between the third terminal 83 and the fourth terminal 84. A current path passing through the first terminal 81, the strain gauge 21, the second terminal 82, the strain gauge 22, and the fourth terminal 84 constitutes a first path 86. A current path passing through the first terminal 81, the strain gauge 24, the third terminal 83, the strain gauge 23, and the fourth terminal 84 constitutes a second path 87.

The strain gauges 21, 22, 23, and 24 are resistor elements whose resistance value changes in accordance with the amount of strain. In this embodiment, the strain gauge includes a material having a gauge factor of four or more. For example, the strain gauge may include a Cr—N thin film. When the gauge factor of the strain gauge is four or more, it is possible to obtain an output desired as the six-component force detector 1 for detecting the load applied to the wheel. However, the strain gauge is not limited to the Cr—N thin film.

When a load is applied to the strain generating body in the bridge circuit 80, strain is generated in each of the strain gauges 21, 22, 23, and 24, and the resistance value of each of the strain gauges 21, 22, 23, and 24 changes in accordance with the amount of strain. The bridge circuit 80 outputs an electric signal corresponding to a potential difference between the second terminal 82 of the first path 86 and the third terminal 83 of the second path 87.

In this embodiment, the bridge circuit 80 includes a first chip resistor 91 (91a and 91b) a thermistor 95, and a first adjustment resistor 96 between the strain gauge 22 and the fourth terminal 84 in the first path 86. The thermistor 95 and the first adjustment resistor 96 are connected in series with the first chip resistor 91 and connected in parallel with each other. The bridge circuit 80 further includes a second chip resistor 93 (93a and 93b) and a second adjustment resistor 97 between the strain gauge 23 and the fourth terminal 84 in the second path 87. The second adjustment resistor 97 is connected in series with the second chip resistor 93.

These elements provided in the first path 86 and the second path 87 are provided for the bridge circuit 80 in the following order: the first chip resistor 91, the second chip resistor 93, the thermistor 95, the first adjustment resistor 96, and the second adjustment resistor 97.

The first chip resistor 91 is a resistor element for adjusting a deviation of the initial balance measured in a state in which the strain gauges 21, 22, 23, and 24 are provided in the bridge circuit 80. Since the target resistance value is relatively large, a chip resistor is used as the resistor element. In the example of the bridge circuit 80 illustrated in FIG. 2, the first chip resistor 91 has two resistor elements 91a and 91b connected in parallel with each other. Similarly, the second chip resistor 93 is a resistor element for adjusting the deviation of the initial balance measured in a state in which the strain gauges 21, 22, 23, and 24 are provided in the bridge circuit 80. In the example of the bridge circuit 80 illustrated in FIG. 2, the second chip resistor 93 has two resistor elements 93a and 93b connected in parallel with each other.

In general, chip resistors designed to have predetermined resistance values at given intervals are prepared. As the first chip resistor 91 and the second chip resistor 93 provided in a state in which the strain gauges 21, 22, 23, and 24 are connected in the bridge circuit 80, the following chip resistors are used. The chip resistors have appropriate resistance values with which the resistance values of the first path 86 and the second path 87 become resistance values according to the purpose. In this embodiment, first, chip resistors (hereafter, also referred to as "temporary resistors") 91a and 93a having given resistance values with which resistance values of the first path 86 and the second path 87 can be set to resistance values according to the purpose are selected. Then, the chip resistors 91a and 93a are connected in the first path 86 and the second path 87, respectively.

Furthermore, the initial balance of the bridge circuit 80 at a predetermined reference temperature is measured in a state in which the temporary resistors 91a and 93a are connected in the bridge circuit 80. The chip resistors (hereafter, also referred to as "shunt resistors") 91b and 93b having resistance values with which the deviation of the initial balance can be eliminated are selected, and connected in parallel with the temporary resistors 91a and 93a, respectively. As a result, the deviation of the initial balance of the bridge circuit 80 at the predetermined reference temperature can fall within a desired range. Note that the shunt resistors 91b and 93b may be unnecessary if the deviation of the initial balance of the bridge circuit 80 at the predetermined reference temperature falls within the desired range with only the temporary resistors 91a and 93a.

It is assumed that the initial balance of the bridge circuit 80 is adjusted in a state in which the first chip resistor 91 and the second chip resistor 93 are connected in the bridge circuit 80. In this case, if respective sides provided with the strain gauges 21, 22, 23, and 24 have equivalent temperature characteristics, the respective temperature characteristics are canceled by the configuration of the bridge circuit 80, and no output is generated in a state in which no load is applied. On the other hand, if an output is generated even though no load is applied, it can be determined that the initial balance of the bridge circuit 80 is deviated. Therefore, in this embodiment, the thermistor 95, which is a temperature compensation element having inverse characteristics of the temperature characteristics reflected in the output from the bridge circuit 80, is incorporated in the bridge circuit 80 to compensate for the temperature characteristics.

The thermistor 95 is a resistor element for compensating for the temperature characteristics of the bridge circuit 80 in a state in which the first chip resistor 91 and the second chip resistor 93 are connected in the bridge circuit 80. As the thermistor 95, an NTC (Negative Temperature Coefficient) thermistor having characteristics in which a resistance value decreases with an increase in temperature is used. The thermistor 95 generally has a high resistance value (for example, 1 kΩ or more) and is suitable for temperature characteristics compensation. The temperature coefficient of resistance, which indicates the rate of decrease in the resistance value of the thermistor 95 with an increase in temperature, is desirably larger. The first adjustment resistor 96 is a resistor element for adjusting the deviation of the initial balance in a state in which the first chip resistor 91 and the thermistor 95 are provided in the bridge circuit 80. The second adjustment resistor 97 is a resistor element for adjusting the deviation of the initial balance caused by providing the first adjustment resistor 96 in the first path 86.

In the bridge circuit 80 in which the first chip resistor 91 and the second chip resistor 93 are connected, the initial balance of the bridge circuit 80 at the predetermined reference temperature is adjusted. However, since each of the first chip resistor 91 and the second chip resistor 93 has the temperature characteristics, the output of the bridge circuit 80 also has the temperature characteristics. Therefore, the thermistor 95 and the first adjustment resistor 96 are connected in parallel with each other and in series with the first chip resistor 91. The thermistor 95 can measure the temperature characteristics of the bridge circuit 80 in which the first chip resistor 91 and the second chip resistor 93 are connected and compensate for the temperature characteristics. The first adjustment resistor 96 is to restore the initial balance that has deviated by connecting the thermistor 95 in the first path 86.

In addition, the second adjustment resistor 97 for balancing the resistance values of the first path 86 and the second path 87 is connected in series with the second chip resistor 93. The resistance value of the second adjustment resistor 97 may be made different from the resistance value of the first adjustment resistor 96 to eliminate the deviation of the initial balance between the resistance values of the first path 86 and the second path 87. However, it is difficult to grasp the temperature characteristics of the thermistor 95 and the first adjustment resistor 96 in advance, and thus, the second adjustment resistor 97 may temporarily be the same resistor element as the first adjustment resistor 96.

The first adjustment resistor 96 and the second adjustment resistor 97 for adjusting the deviation of the initial balance are desirably resistor elements having a low temperature coefficient of resistance indicating a change rate of a resistance value with respect to a temperature change, for example, 1 Ω or less. Examples of such a resistor element include an element made of one or a mixed material of two or more of zinc, tungsten, aluminum, pure iron, iridium, steel, copper, gold, nickel, silver, platinum, palladium, and tin.

2-3. Output Adjustment Method of Load Cell

Next, the output adjustment method of the load cell according to this embodiment will be described by taking the six-component force detector 1 as an example. In the output adjustment method of the load cell described below, an example will be described in which the output is adjusted with the target value of the temperature characteristics compensation of each force detection system and each moment detection system set to 0.2 mV/V.

Figure 4:
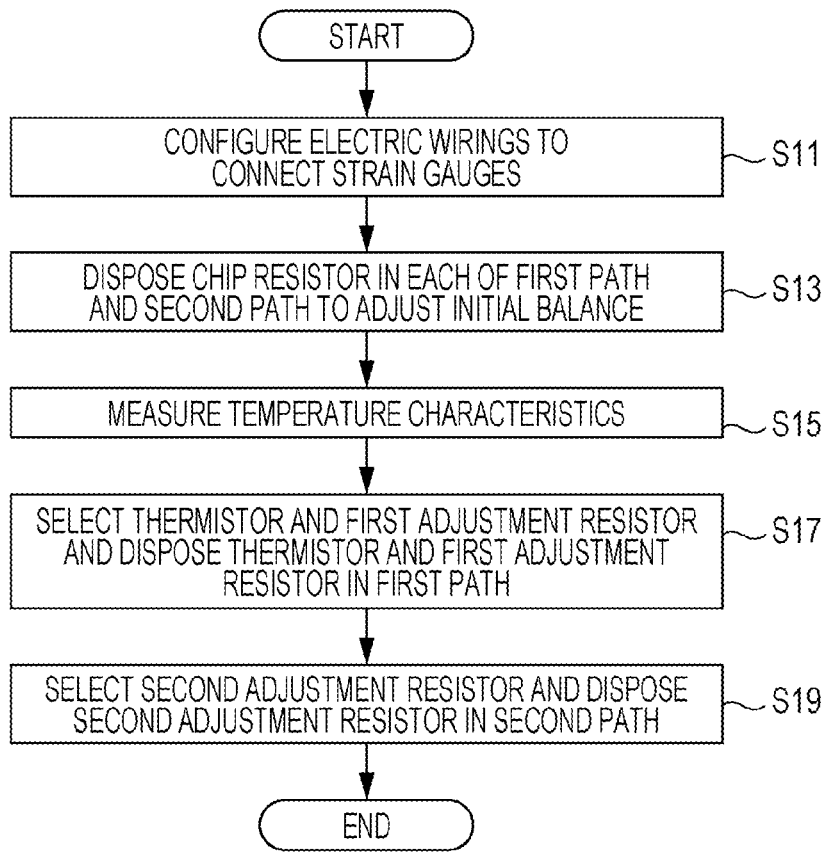
FIG. 4 is a flowchart illustrating a procedure of an output adjustment method of the load cell according to the embodiment.

FIG. 4 is a flowchart illustrating a procedure of the output adjustment method of the load cell.

First, for example, gauge leads are connected to strain gauges disposed on a cylinder as a strain generating body with an insulating layer interposed therebetween to configure electric wirings, and a bridge circuit is formed in which four strain gauges are electrically connected (step S11). For example, in the bridge circuit of the Fx detection system, the strain gauge 21 is connected between the first terminal 81 and the second terminal 82, and the strain gauge 22 is connected between the second terminal 82 and the fourth terminal 84. In addition, the strain gauge 24 is connected between the first terminal 81 and the third terminal 83, and the strain gauge 23 is connected between the third terminal 83 and the fourth terminal 84.

At the completion of step S11, the positions to which resistor elements for adjusting an initial balance and compensating for temperature characteristics are to be connected are short-circuited. The step of electrically connecting the four strain gauges is performed for the six sets of four strain gauges constituting the force detection systems and the moment detection systems.

Figure 5:
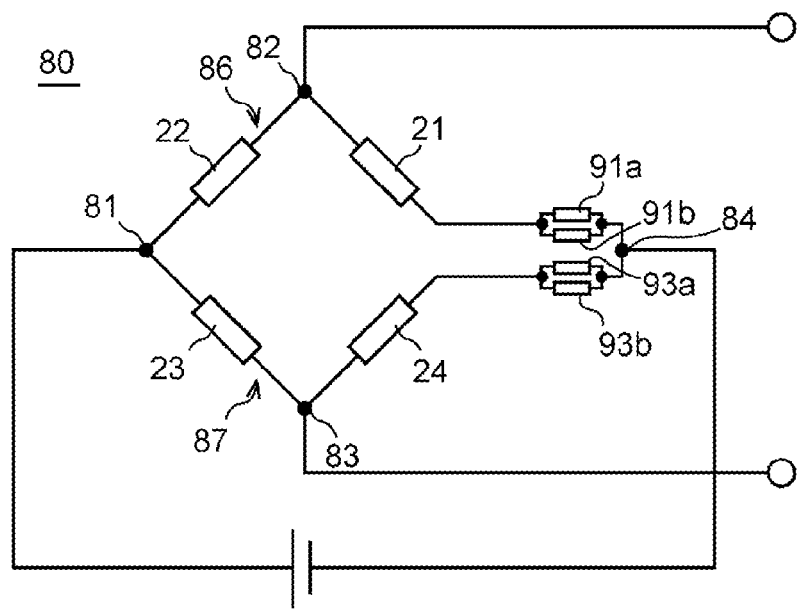
FIG. 5 is an explanatory diagram illustrating a first adjustment in the output adjustment method of the load cell according to the embodiment.

Subsequently, a first chip resistor and a second chip resistor are connected in a first path on one side and a second path on the other side of the bridge circuit, respectively, and a first adjustment is performed for adjusting the initial balance of the bridge circuit (step S13). For example, in the bridge circuit of the Fx detection system, as illustrated in FIG. 5, the first chip resistor 91 (the temporary resistor 91a and the shunt resistor 91b) is connected between the strain gauge 22 and the fourth terminal 84 in the first path 86. The first path 86 passes through the first terminal 81, the strain gauge 21, the second terminal 82, the strain gauge 22, and the fourth terminal 84. In addition, the second chip resistor 93 (the temporary resistor 93a and the shunt resistor 93b) is disposed between the strain gauge 23 and the fourth terminal 84 in the second path 87. The second path 87 passes through the first terminal 81, the strain gauge 24, the third terminal 83, the strain gauge 23, and the fourth terminal 84.

For example, the temporary resistors 91a and 93a having given resistance values with which the resistance values of the first path 86 and the second path 87 can be set to the resistance values according to the purpose are selected and connected in the first path 86 and the second path 87, respectively. The resistance values of the temporary resistors 91*a* and 93*a* may be calculated based on the resistance values of the strain gauges 21, 22, 23, and 24 and the electric wirings such as the gauge leads.

Furthermore, the initial balance of the bridge circuit 80 at the predetermined reference temperature is measured in a state in which the temporary resistors 91*a* and 93*a* are connected in the bridge circuit 80. Then, the shunt resistors 91*b* and 93*b* having resistance values with which the deviation of the initial balance can be eliminated are selected and connected in parallel with the temporary resistors 91*a* and 93*a*, respectively. As a result, the deviation of the initial balance of the bridge circuit 80 at the predetermined reference temperature can fall within the desired range. Note that the shunt resistors 91*b* and 93*b* are not necessarily connected if the deviation of the initial balance of the bridge circuit 80 at the predetermined reference temperature falls within the desired range with only the temporary resistors 91*a* and 93*a*.

In step S13, the first chip resistor and the second chip resistor are connected in the first path and the second path, respectively, in the bridge circuit of the six detection systems.

Subsequently, the temperature characteristics of the output of the bridge circuit are measured in a state in which the first chip resistor and the second chip resistor are connected in the bridge circuit (step S15). Here, the temperature characteristics of the outputs of force detection systems and moment detection systems in a use temperature range of the six-component force detector 1 are measured. A method of measuring the temperature characteristics may be a known method of the related art.

Figure 6:
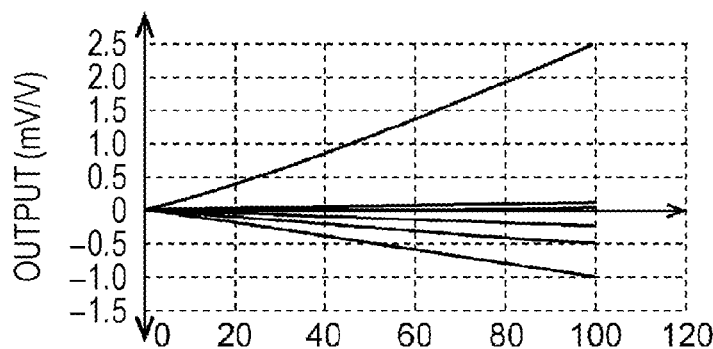
FIG. 6 is an explanatory diagram illustrating an output state after the first adjustment in the output adjustment method of the load cell according to the embodiment.

FIG. 6 illustrates an example of the temperature characteristics of outputs of six detection systems in an assumed use temperature range (0 to 100° C.). The temperature characteristics are measured in a state in which the first chip resistor is connected in the first path in the bridge circuit and the second chip resistor is connected in the second path (after the first adjustment). In the example illustrated in FIG. 6, the temperature characteristics of outputs of three detection systems among the outputs of the six detection systems are equal to or greater than 0.5 mV/V and exceed the target of the temperature characteristics compensation.

In response to the measurement results of the temperature characteristics, in the subsequent step S17, a second adjustment is performed (step S17). In the second adjustment, a thermistor for compensating for the temperature characteristics and a first adjustment resistor for adjusting the deviation of the initial balance caused by providing the thermistor are connected in the first path in parallel with each other and in series with the first chip resistor. Subsequently, a second adjustment resistor is connected in the second path in parallel with the second chip resistor in order to reduce the deviation of the balance of the resistance value caused by connecting the thermistor and the first adjustment resistor in the first path (step S19). For example, in the bridge circuit of the Fx detection system, the thermistor 95 and the first adjustment resistor 96 are connected in the first path 86 in parallel with each other and in series with the first chip resistor 91. In addition, the second adjustment resistor 97 is connected in the second path 87 in series with the second chip resistor 93 (see FIG. 3).

In steps S17 to S19, the thermistor and the first adjustment resistor are connected in the first path, and the second adjustment resistor is connected in the second path, in the bridge circuit of the six detection systems. As a result, the outputs of all of the six detection systems are adjusted to be less than 0.2 mV/V, which is the target of the temperature characteristics compensation.

In this manner, according to the load cell and the output adjustment method of the load cell according to the embodiment of the present disclosure, the following can be achieved. Even if the change in the resistance value due to the temperature change in the use temperature range is large, it is possible to easily compensate for the temperature characteristics of the output of the bridge circuit. Even in the case of the six-component force detector that detects component forces, the temperature characteristics of the outputs of all the detection systems can be made less than the target. Therefore, the initial balance of the resistance value can be easily adjusted while compensating for the temperature characteristics of the load cell.

In the above-described embodiment, the thermistor and the first adjustment resistor are connected in the first path in the bridge circuit, and the second adjustment resistor is connected in the second path. In this case, the first path may be either the positive side or the negative side of the input.

2-4. Application Example

The load cell and the output adjustment method of the load cell according to this embodiment have been described above. Next, an application example of the technology of the present disclosure will be described.

In the above-described embodiment, if the second adjustment resistor 97 identical to the first adjustment resistor 96 is provided in the second path 87, the following may occur. The combined resistance of the thermistor 95 and the first adjustment resistor 96 becomes small in the first path 86, and the resistance value of the first path 86 may be excessively returned. Therefore, in the application example, the initial balance of the bridge circuit 80 is measured again in a state in which the first chip resistor 91, the second chip resistor 93, the thermistor 95, the first adjustment resistor 96, and the second adjustment resistor 97 are connected in the bridge circuit 80. In addition, in order to further adjust the deviation of the initial balance, a third adjustment resistor is connected.

Figure 7:
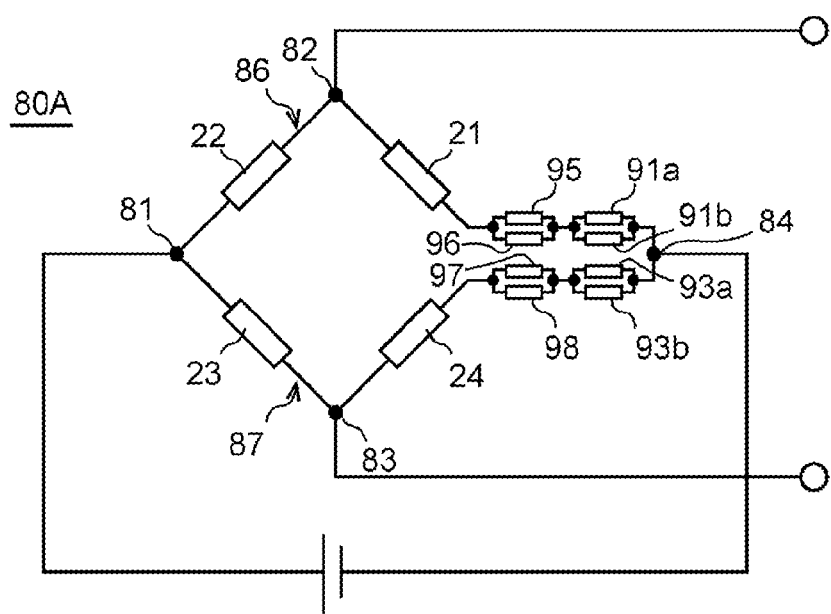
FIG. 7 is an explanatory diagram illustrating a configuration of a bridge circuit in a load cell according to an application example of the embodiment.

FIG. 7 is an explanatory diagram illustrating the configuration of a bridge circuit 80A according to the application example, and illustrates the bridge circuit of the Fx detection system as in FIG. 3.

In the application example, the bridge circuit 80A includes the second chip resistor 93 (93*a* and 93*b*), the second adjustment resistor 97, and a third adjustment resistor 98 between the strain gauge 23 and the fourth terminal 84 in the second path 87. The second adjustment resistor 97 and the third adjustment resistor 98 are connected in series with the second chip resistor 93 and connected in parallel with each other.

These elements provided in the first path 86 and the second path 87 are provided for the bridge circuit 80A in the following order: the first chip resistor 91 and the second chip resistor 93, the thermistor 95, the first adjustment resistor 96 and the second adjustment resistor 97, and the third adjustment resistor 98. The third adjustment resistor 98 is a resistor element for adjusting the deviation of the initial balance caused by providing the second adjustment resistor 97 in the second path 87.

Similarly to the first adjustment resistor 96 and the second adjustment resistor 97, the third adjustment resistor 98 is desirably a resistor element having a low temperature coefficient of resistance indicating a change rate of a resistance value with respect to a temperature change, for example, 1 Ω or less.

The third adjustment resistor 98 is connected in the second path 87 in parallel with the second adjustment resistor 97 in the example illustrated in FIG. 7. However, the third adjustment resistor 98 may also be connected in the first path 86 in parallel with the thermistor 95 and the first adjustment resistor 96 in accordance with the deviation of the initial balance. In addition, even after the third adjustment resistor 98 is connected, the deviation of the initial balance is not necessarily eliminated. In such a case, a fourth adjustment resistor may be further connected in the first path 86 or the second path 87 so that the deviation of the initial balance can fall within a predetermined range.

Figure 8:
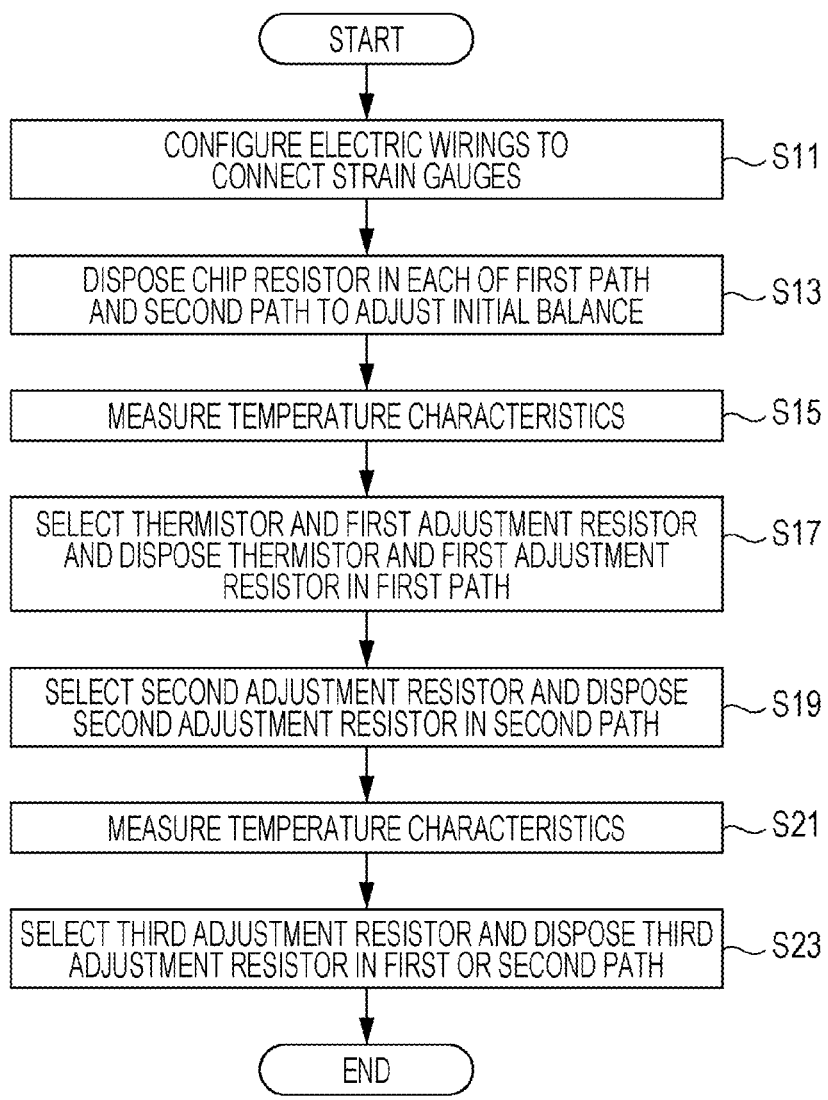
FIG. 8 is a flowchart illustrating a procedure of an output adjustment method of the load cell according to the application example.

FIG. 8 is a flowchart illustrating a procedure of an output adjustment method of a load cell according to the application example. Steps S11 to S19 are performed in accordance with the procedure described in the above embodiment.

Figure 9:
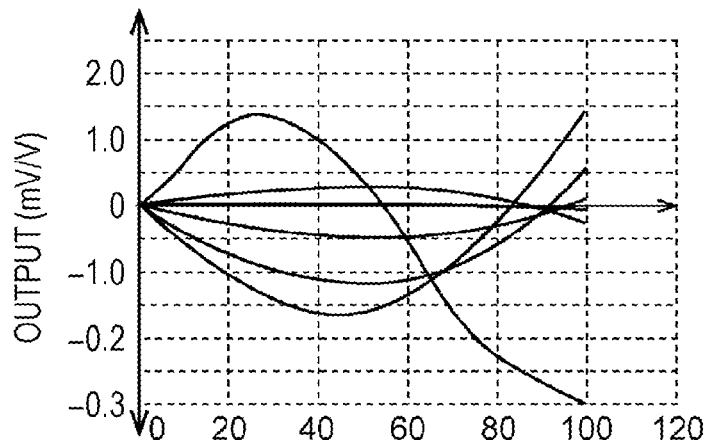
FIG. 9 is an explanatory diagram illustrating an output state after a second adjustment in the output adjustment method of the load cell according to the application example.

In the application example, after the second adjustment is performed, the temperature characteristics of the outputs of the six detection systems are further measured (step S21). FIG. 9 illustrates an example of the temperature characteristics of the outputs of the six detection systems measured in the following state (after the second adjustment). The first chip resistor, the thermistor, and the first adjustment resistor are connected in the first path in the bridge circuit, and the second chip resistor and the second adjustment resistor are connected in the second path. As illustrated in FIG. 9, the temperature characteristics of the six detection systems except for one detection system are lower than 0.2 mV/V, which is the target of the temperature characteristics compensation. However, there may be a case where the temperature characteristics of the one detection system becomes 0.3 mV/V and exceeds the target of the temperature characteristics compensation.

Accordingly, in response to the measurement results of the temperature characteristics, in the subsequent step S23, a third adjustment is performed as follows (step S23). The third adjustment resistor for adjusting the deviation of the initial balance caused by providing the second adjustment resistor in the second path is connected in the first path or the second path. That is, after the temperature characteristics compensation by the thermistor is slightly overcompensated, the temperature characteristics are measured again, and if the temperature characteristics still exceed the target, double compensation is performed so that the compensation can be performed with higher accuracy. For example, in the bridge circuit of the Fx detection system, as illustrated in FIG. 7, the third adjustment resistor 98 is connected in the second path 87 in parallel with the second adjustment resistor 97. Whether the third adjustment resistor is connected in the first path or the second path is determined depending on whether the output due to the temperature characteristics is deviated to the positive side or the negative side.

Figure 10:
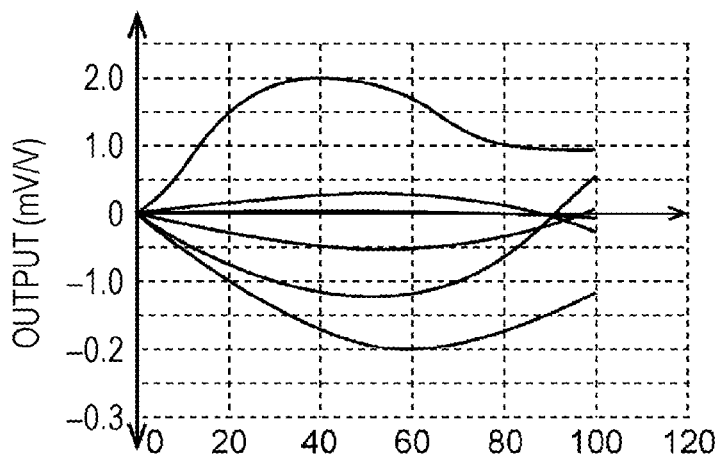
FIG. 10 is an explanatory diagram illustrating an output state after a third adjustment in the output adjustment method of the load cell according to the application example.

FIG. 10 illustrates an example of the temperature characteristics of the outputs of the six detection systems measured in the following state (after the third adjustment). The first chip resistor, the thermistor, and the first adjustment resistor are connected in the first path in the bridge circuit, and the second chip resistor, the second adjustment resistor, and the third adjustment resistor are connected in the second path. In the example illustrated in FIG. 10, by connecting the third adjustment resistor, the outputs of all the six detection systems fall below 0.2 mV/V, which is the target of the temperature characteristics compensation.

Even if the third adjustment resistor is connected in the first path or the second path, as long as the temperature characteristics of the output of at least one of the six detection systems greatly exceed the target, the following step is further performed. In the step, a fourth adjustment resistor is connected in the first path or the second path. The final resistance value of the adjustment resistor such as the third adjustment resistor or the fourth adjustment resistor so that the temperature characteristics can fall within the compensation target may be calculated based on the measurement results of the temperature characteristics.

In this manner, according to the load cell and the output adjustment method of the load cell according to the application example, the following can be achieved. Even if the change in the resistance value due to the temperature change in the use temperature range is large, it is possible to more reliably compensate for the temperature characteristics of the output of the bridge circuit.

The preferred embodiment of the disclosure has been described above in detail with reference to the accompanying drawings, but the disclosure is not limited to such examples. It is clear that a person having ordinary skill in the art can conceive of various modifications or corrections within the technical idea described in the claims. It is to be understood that these are naturally included in the technical scope of the disclosure.

For example, the above-described embodiment has described an example of the load cell in which the single-axis strain gauge is used, but the load cell to which the technique of the present disclosure can be applied is not limited to such an example. For example, the technique of the present disclosure can also be applied to a load cell using a biaxial shear strain gauge illustrated in FIGS. 11 and 12.

Figure 11:
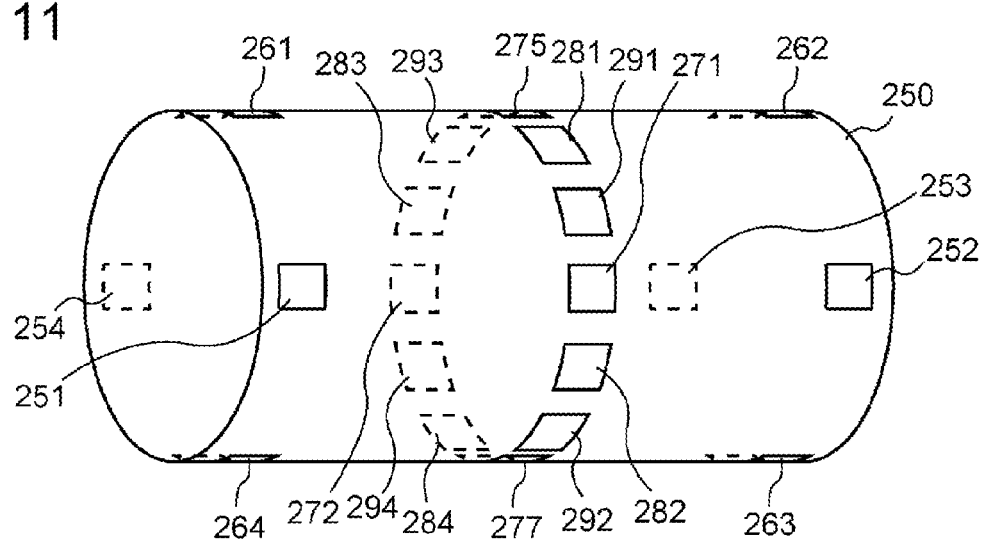
FIG. 11 is a schematic diagram illustrating an arrangement of strain gauges in a six-component force detector according to a modification.
Figure 12:
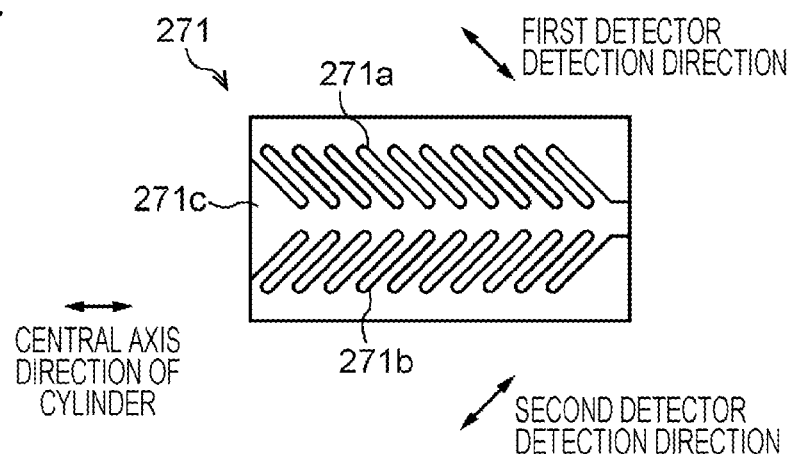
FIG. 12 is an explanatory diagram illustrating a gauge pattern of a biaxial shear strain gauge.

For example, FIG. 11 is a schematic diagram illustrating an arrangement of strain gauges in a six-component force detector according to a modification, and FIG. 12 is an explanatory diagram illustrating a gauge pattern of the biaxial shear strain gauge. The six-component force detector illustrated in FIG. 11 is provided with shear strain gauges 271 and 272 of the Fx detection system and shear strain gauges 275 and 277 of the Fz detection system, which will be described below. The shear strain gauges 271 and 272 and the shear strain gauges 275 and 277 are provided instead of the strain gauges 21 to 24 of the Fx detection system and the strain gauges 31 to 34 of the Fz detection system. FIG. 12 illustrates the shear strain gauge 271 as an example, but the shear strain gauges 272, 275, and 277 also have substantially the same gauge pattern.

The shear strain gauge 271 is configured as a so-called arrow-shaped biaxial (bipolar) strain gauge. In the shear strain gauge 271, a first detector 271*a* and a second detector 271*b* made of a Cr—N thin film or the like are formed on a common insulating layer 271*c*, which is an insulating thin film. Each of the first detector 271*a* and the second detector 221*b* is configured by sequentially connecting, in series, linear portions arranged in parallel along the detection directions. The first detector 271*a* and the second detector 271*b* are set such that the electric resistance easily changes in accordance with the strain in the direction (detection direction) in which the linear portion expands and contracts. The detection directions of the first detector 271*a* and the second detector 271*b* are arranged to be substantially orthogonal to each other. The shear strain gauge 271 is attached to the outer peripheral surface of a cylinder 250 in the following manner. The detection directions of the first detector 271*a* and the second detector 271*b* are inclined in opposite directions by 45° with respect to the central axis direction of the cylinder 250. Note that the shear strain gauges 272, 275, and 277 are attached to the outer peripheral surface of the cylinder 250 in substantially the same manner.

As illustrated in FIG. 11, the shear strain gauges 271, 272, 275, and 277 are attached to the outer peripheral surface of the center of the cylinder 250 in the central axis direction. The shear strain gauge 271 of the Fx detection system is disposed in the middle between strain gauges 251 and 252 of the Mx detection system. The shear strain gauge 272 of the Fx detection system is disposed in the middle between strain gauges 253 and 254 of the Mx detection system (at a position symmetrical to the shear strain gauge 271 with respect to the central axis). The shear strain gauge 275 of the Fz detection system is disposed in the middle between strain gauges 261 and 262 of the Mz detection system. The shear strain gauge 277 of the Fz detection system is disposed in the middle between strain gauges 263 and 264 of the Mz detection system (at a position symmetrical to the shear strain gauge 275 with respect to the central axis).

Furthermore, strain gauges 281 to 284 of the Fy detection system and strain gauges 291 to 294 of the My detection system are arranged at positions shifted around the central axis. This is for avoiding interference with the strain gauges 271 and 272 of the Fx detection system and the strain gauges 275 and 277 of the Fz detection system. For example, as illustrated in FIG. 11, the shear strain gauge 271, the strain gauge 282, the strain gauge 292, the shear strain gauge 277, the strain gauge 284, and the strain gauge 294 may be sequentially arranged along the circumferential direction of the cylinder 250 at positions shifted at intervals of 30° about the central axis. In addition, the shear strain gauge 272, the strain gauge 283, the strain gauge 293, the shear strain gauge 275, the strain gauge 281, and the strain gauge 291 may be sequentially arranged along the circumferential direction of the cylinder 250 at positions shifted at intervals of 30° about the central axis.

The first detector and the second detector included in each of the shear strain gauges 271 and 272 of the Fx detection system constitute a bridge circuit that is substantially the same as the bridge circuit illustrated in FIG. 3. This bridge circuit generates an output corresponding to a component force in an Fx direction input to the cylinder 250. Similarly, the first detector and the second detector included in each of the shear strain gauges 275 and 277 of the Fz detection system constitute a bridge circuit that is substantially the same as the bridge circuit illustrated in FIG. 3. This bridge circuit generates an output corresponding to a component force in an Fz direction input to the cylinder 250.

The technique of the present disclosure can also be applied to the load cell using the biaxial shear strain gauge configured as described above, and the effects obtained by the above-described embodiment can be achieved.

REFERENCE SIGNS LIST 21, 22, 23, 24 strain gauge
80, 80A bridge circuit
81 first terminal
82 second terminal
83 third terminal
84 fourth terminal
86 first path
87 second path
91 first chip resistor
91a resistor element (temporary resistor)
91b resistor element (shunt resistor)
93 second chip resistor
93a resistor element (temporary resistor)
93b resistor element (shunt resistor)
95 thermistor
96 first adjustment resistor
97 second adjustment resistor
98 third adjustment resistor

The invention claimed is:

1. A load cell comprising a bridge circuit configured to convert a change in resistance of a strain gauge, which changes in accordance with a load, into an electric signal and output the electric signal, the load cell comprising:
in a first path on one side of the bridge circuit,
a first chip resistor configured to adjust an initial balance of the bridge circuit; and
a thermistor configured to compensate for a temperature characteristic of the bridge circuit and a first adjustment resistor configured to adjust a deviation of the initial balance in a state in which the thermistor is provided, the thermistor and the first adjustment resistor being connected in series with the first chip resistor and connected in parallel with each other, and
in a second path on another side of the bridge circuit,
a second chip resistor configured to adjust the initial balance of the bridge circuit; and
a second adjustment resistor configured to adjust the deviation of the initial balance caused by providing the first adjustment resistor in the first path, the second adjustment resistor being connected in series with the second chip resistor.

2. The load cell according to claim 1, wherein the strain gauge has an element resistance value of greater than or equal to 1 KΩ.

3. The load cell according to claim 1, wherein the load cell comprises a multi-component force detector configured to detect component forces.

4. The load cell according to claim 1, wherein the first adjustment resistor and the second adjustment resistor are identical resistor elements.

5. The load cell according to claim 4, further comprising in one or both of the first path and the second path, a third adjustment resistor configured to adjust the deviation of the initial balance caused by providing the second adjustment resistor.

6. An output adjustment method of a load cell comprising a bridge circuit configured to convert a change in resistance of a strain gauge, which changes in accordance with a load, into an electric signal and output the electric signal, the output adjustment method comprising:
connecting a first chip resistor configured to adjust an initial balance of the bridge circuit, in a first path on one side of the bridge circuit;
connecting a second chip resistor configured to adjust the initial balance of the bridge circuit, in a second path on another side of the bridge circuit;
connecting a thermistor configured to compensate for a temperature characteristic of the bridge circuit and a first adjustment resistor configured to adjust a deviation of the initial balance in a state in which the thermistor is provided, the thermistor and the first adjustment resistor being connected in series with the first chip resistor, in parallel with each other in the first path; and
connecting a second adjustment resistor configured to adjust the deviation of the initial balance caused by providing the first adjustment resistor in the first path, the second adjustment resistor being connected in series with the second chip resistor, in the second path.

7. The output adjustment method of the load cell according to claim 6, further comprising:
   connecting, in one or both of the first path and the second path, a third adjustment resistor configured to adjust the deviation of the initial balance caused by providing the second adjustment resistor.

\* \* \* \* \*